US012669931B2

(12) United States Patent
Shin

(10) Patent No.: US 12,669,931 B2
(45) Date of Patent: Jun. 30, 2026

(54) TOUCHPAD ACTIVATION REGIONS FOR DYNAMIC TOUCH SENSOR ACTIVATION

(71) Applicant: GOOGLE LLC, Mountain View, CA (US)

(72) Inventor: Dongeek Shin, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/938,107

(22) Filed: Nov. 5, 2024

(65) Prior Publication Data

US 2026/0126906 A1     May 7, 2026

(51) Int. Cl.
*G06F 3/04886* (2022.01)

(52) U.S. Cl.
CPC ................................ *G06F 3/04886* (2013.01)

(58) Field of Classification Search
CPC .. G06F 3/04886; G06F 3/041; G06F 3/04186; G06F 3/044
See application file for complete search history.

(56) References Cited

U.S. PATENT DOCUMENTS 9,285,872 B1     3/2016  Raffle et al.
2011/0194029 A1  8/2011  Herrmann et al.

| | | | |
|---|---|---|---|
| 2015/0242067 A1* | 8/2015 | Ainslie | G06F 3/0418 |
| | | | 345/173 |
| 2016/0209658 A1 | 7/2016 | Zalewski | |
| 2017/0336891 A1* | 11/2017 | Rosenberg | G06F 3/04144 |
| 2019/0113995 A1* | 4/2019 | Kies | H03K 17/9622 |
| 2019/0310755 A1* | 10/2019 | Sasaki | G06F 3/044 |
| 2022/0019282 A1 | 1/2022 | Zhou et al. | |
| 2022/0254120 A1* | 8/2022 | Berliner | G06F 3/011 |
| 2022/0276758 A1* | 9/2022 | Pallerla | G06F 21/32 |
| 2023/0121539 A1* | 4/2023 | Gupta | G09B 21/006 |

OTHER PUBLICATIONS

Lee, J. et al., "Exploring the Front Touch Interface for Virtual Reality Headsets", Proceedings of the 2016 chi Conference Extended Abstracts on Human Factors in Computing Systems; May 7, 2016; pp. 2585-2591.

* cited by examiner

*Primary Examiner* — Rodney Amadiz

(57) ABSTRACT

A user device includes a touchpad having touch sensors configured to detect user interactions. Initially, the user device is configured to activate each touch sensor of the touchpad based on a default probability such that the activated touch sensors are provided power and are able to detect user interactions. Based on receiving a first user interaction, the user device arranges the touch sensors of the touchpad into groups and assigns each group a corresponding probability. For each touch sensor in each of these groups, the user devices determines whether to activate or not activate the touch sensor based on the probability corresponding to the group of the touch sensor. In response to determining that a touch sensor is to be activated, the user device provides power to the touch sensor such that the touch sensor is able to detect user interactions.

21 Claims, 5 Drawing Sheets

TOUCHPAD ACTIVATION REGIONS FOR DYNAMIC TOUCH SENSOR ACTIVATION

BACKGROUND

Some user devices are configured to execute applications that are controlled by one or more user interactions such as the tapping, swiping, gesturing, or pressing of a user's finger. To receive these user interactions, the user devices include or are connected to a touchpad that has touch sensors configured to detect the presence of user interactions with the touchpad. For example, in response to a user interacting with the touchpad, corresponding touch sensors output a signal indicating that the presence of the user interaction was detected. Using these signals from the touch sensors, the user device determines one or more tasks associated with executing applications such as the modification of one or more functions of the applications. The user device then accordingly modifies one or more of the executing applications as indicated by the determined tasks.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
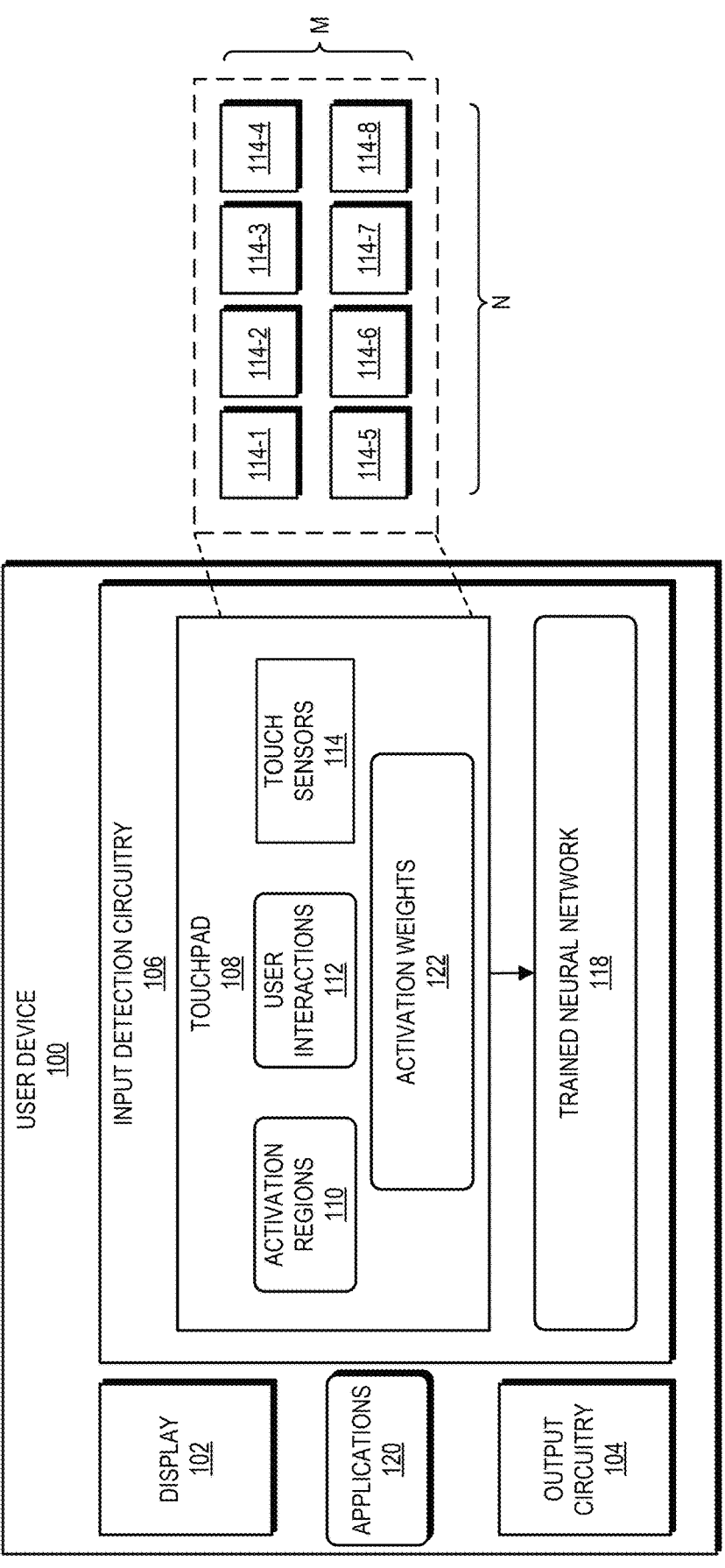
FIG. 1 is a block diagram of a user device configured to dynamically adjust activation regions of a touchpad, in accordance with some embodiments.

Systems and techniques disclosed herein include user devices having input detection circuitry configured to receive one or more user interactions. Such user devices, for example, include wearable devices, extended reality (XR) displays, audio devices, and the like. Further, these user devices are configured to control one or more applications running on the user device, a processing system (e.g., computer, server) communicatively coupled to the user device, or both based on one or more received user interactions. As an example, based on executing a software application, a user device displays a user interface that controls one or more functions of the software application based on user interactions. As another example, based on executing a streaming application, a user device is configured to control the displayed video, output audio, or both based on one or more user interactions. To receive these user interactions, the user device includes an input detection circuitry having one or more touch sensors each configured to detect the presence of a user interaction via capacitance. As an example, to detect user interactions, a user device includes a touchpad having touch sensors arranged in a predetermined number of columns and a predetermined number of rows with each touch sensor configured to generate signals indicating that an interaction with the touchpad by a user's finger, a stylus, or the like is proximate to (e.g., within a predetermined range from) the touch sensor. That is, the touch sensors each generate signals indicating an interaction with the touchpad is proximate to the touch sensor. Such an interaction includes, for example, a user's finger or a stylus tapping the touchpad, dragging across the touchpad, pressing the touchpad, performing gestures on the touchpad, or any combination thereof.

Based on the interaction with the touchpad, the input detection circuitry determines function controls for an executing software application with each function control indicating one or more tasks to be performed by the application. For example, the input detection circuitry is configured to provide, as an input, data indicating the signals generated by the touch sensors to a trained neural network. This trained neural network is configured to, based on the data indicating the signals generated by the touch sensors, generate one or more function controls each indicating one or more tasks to be performed by an application. For example, the trained neural network outputs one or more function controls that include the click of an icon, drag of an icon, movement of a slider, press of a button, rotation of an object, input of text, resizing of windows, and the like. As another example, the trained neural network outputs one or more function controls that indicate tasks such as modifying a volume, playing media, pausing media, fast forwarding media, rewinding media, skipping media, changing operating modes, activating a device, or any combination thereof. To generate these function controls, the trained neural network includes, for example, one or more convolutional layers configured to determine one or more features (e.g., speed, direction, duration, location) of an interaction with the touchpad from data representing the signals generated by the touch sensors. From these determined features, the train machine-learning model then determines one or more corresponding function controls. As an example, the trained neural network maps the determined features to one or more function controls based on the parameters (e.g., weights) of the trained neural network.

In this way, a user device is configured to control a software application based on one or more received user interactions. To help reduce the power consumption of such a user device, systems and techniques disclosed herein are directed toward a user device configured to control the activation of touch sensors based on dynamically adjusted activation regions. Such activation regions, for example, each include a group of one or more touch sensors and are each associated with a corresponding activation weight that represents a respective probability for activation. Using the corresponding activation weight associated with a respective activation region, the input detection circuitry activates the touch sensors within the activation region. As an example, for each touch sensor within an activation region, the input detection circuitry performs a Bernoulli trial based on the activation weight associated with the activation region to determine the activation status (e.g., on or off) for the touch sensor. The input detection circuitry then activates each touch sensor with an activation status of on. In this way, the input detection circuitry is configured to only activate a portion of the touch sensors of the touchpad, reducing the power consumption of the touchpad and the user device overall.

Additionally, to help ensure that user interactions are not lost due to non-active touch sensors, the input detection circuitry is configured to dynamically change one or more activation regions of the touchpad based on user interactions. For example, initially, the input detection circuitry implements a default activation region that includes each touch sensor of the touchpad and that has a default predetermined activation weight. Based on receiving a user interaction at the touchpad, the input detection circuitry defines one or more new activation regions each including respective groups of the touch sensors and each having a corresponding activation weight. As an example, based on the signals output by one or more active touch sensors, the input detection circuitry determines one or more features of a user interaction such as the location of the user interaction on the touchpad, speed of the user interaction, direction of the user interactions (e.g., relative to the touchpad), duration of the user interaction, or any combination thereof. Using these determined features of the user interaction, the input detection circuitry defines one or more new application regions. For example, the input detection circuitry determines a location on the touchpad at which the user interaction was received based on the touch sensors that detected the presence of the user interaction. The input detection circuitry then defines a first activation region that includes each touch sensor within the location. Additionally, the input detection circuitry associates this first activation region with an activation weight such that each touch sensor in the first activation region is active, allowing the touch sensors in the first activation region to continue to detect the user interaction. Additionally, based on the direction of the user interaction, the input detection circuitry determines a second activation region that includes one or more touch sensors that are a number of touch sensors away from the first activation region and associates this second activation region with a second activation weight that represents lower probability than the probability of the activation weight associated with the first activation region. By adjusting the activation regions in this way, the input detection circuitry helps ensure that the current user interaction will be detected by the necessary touch sensors while also deactivating at least a portion of the touch sensors less likely to detect the current user interaction. As such, the input detection circuitry is enabled to detect the user interactions while also reducing the power consumption of the touchpad.

Referring now to FIG. 1, a user device 100 configured to dynamically adjust activation regions for a touchpad is presented, in accordance with some embodiments. User device 100, for example, includes one or more devices configured to execute at least a portion of one or more applications 120 such as compute-enabled phones (e.g., smartphones), wearable devices (e.g., smartwatches, fitness trackers, head-wearable displays (HWDs), earphones, earbuds, hearing aids), computes, laptop computers, tablet computers, or any combination thereof, to name a few. As an example, user device 100 includes an HWD configured to execute at least a portion of an application that causes the HWD to display extended reality (XR) content (e.g., icons, images, text) to the user in a real-world environment visible to the through the HWD. As another example, user device 100 includes a set of earbuds communicatively coupled to a computing device (e.g., smartphone, computer, laptop computer, tablet computer). Further, such applications 120 at least partially executed by user device 100 include multimedia streaming (e.g., video streaming, audio streaming), conferencing, messaging, navigation, productivity, operating system, XR, gaming, phone calling, video calling, or any combination thereof applications, to name a few.

To output one or more signals from one or more software applications 120 (hereinafter, "application 120" for brevity) at least partially executing on user device 100, user device 100 includes display 102 and output circuitry 104. Display 102 is configured to output one or more signals representing text, graphics objects, images, icons, and the like and includes an optical combiner, cathode-ray tube (CRT) display, liquid crystal display (LCD), light emitting diode (LED) display, organic light emitting diode (OLED) display, or any combination thereof, to name a few. For example, based on user device 100 including an HWD, display 102 includes a light engine configured to emit light (e.g., laser light) representative of XR content to be displayed to a user. Further, based on user device 100 including an HWD, display 102 includes a lightguide (e.g., within an optical combiner) configured to direct the light representing the XR content to an eye of the user such that the XR content is presented to the user in a real-world environment visible through the HWD. Additionally, output circuitry 104 includes one or more output devices configured to output one or more signals from an application 120 such as one or more speakers, motors, alarms, lights, and the like. As an example, based on user device 100 including a set of earbuds, output circuitry 104 includes one or more speakers configured to output at least a portion of an audio signal from an application 120.

In embodiments, one or more functions of the applications 120 at least partially executing on user device 100 are configured to be controlled by one or more user interactions 112. As an example, based on user device 100 executing at least a portion of an XR application, an HWD of user device 100 is configured to display an interactive XR user interface that is configured to manage one or more applications based on received user interactions 112 that each represent interactions with one or more interactive icons, text, images, and the like of the interactive XR interface. As another example, based on user device 100 executing a least a portion of an audio streaming application, a set of earbuds of user device 100 is configured to manage one or more functions (e.g., volume up, volume down, skip song, rewind song, summon assistant, noise canceling) of the audio streaming application based on one or more received user interactions 112. To control these applications 120 via user interactions 112, user device 100 includes input detection circuitry 106 that has or is otherwise connected to a touchpad 108 configured to receive such user interactions via capacitance, impedance, infrared, current, optics, or the like. For example, touchpad 108 includes one or more touch sensors 114 each configured to, via capacitance, output a signal indicating a user interaction is proximate to (e.g., within a predetermined distance from) the touch sensor 114. Such user interactions 112 include, for example, a user's finger, a stylus, or both pressing, being dragged across, tapping, making gestures on, or any combination thereof, touchpad 108. In embodiments, the touch sensors 114 of touchpad 108 are configured to output signals indicating the location of touchpad 108 at which a user interaction 112 was received. To this end, touchpad 108 includes a number of touch sensors 114 arranged in a predetermined number (e.g., M) of rows and a predetermined number (e.g., N) of columns. For example, though the example embodiment presented in FIG. 1, touchpad 108 includes eight touch sensors (e.g., 114-1, 114-2, 114-3, 114-4, 114-5, 114-6, 114-7, 114-8) arranged in an M number of rows (where M is an integer >0) and an N number of columns (where N is an integer >0), in other embodiments, touchpad 108 can include any number of touch sensors 114 arranged in any number of row and any number of columns. In some embodiments, the number of rows of touch sensors 114 differs from the number of columns of touch sensors 114 while in other embodiments the number of rows and columns is the same.

Due to the touch sensors 114 being arranged in a predetermined number of rows and a predetermined number of columns, each touch sensor 114 represents a corresponding location on touchpad 108. For example, based on the example embodiment presented in FIG. 1, touch sensor 114-1 represents a location at or adjacent to a top left corner of touchpad 108 and touch sensor 114-8 represents a location at or adjacent to a bottom right corner of touchpad 108. As a touch sensor 114 detects, via capacitance, the presence of a user interaction 112 proximate to (e.g., within a predetermined distance from) the touch sensor 114, the touch sensor 114 outputs a signal indicating the presence of user interaction 112 at a location on the touchpad 108 corresponding to the touch sensor 114. Using the signals output by touch sensors 114 indicating the presence of user interactions 112 and their location on touchpad 108, input detection circuitry 106 is configured to determine one or application function controls. These application function controls, for example, include data that cause an application 120 at least partially executing on user device 100 to perform one or more functions such as launching an application, closing an application, multimedia controls (e.g., video play, video pause, audio play, audio pause, volume up, volume down, skip song, rewind song, skip song, noise canceling settings), text input, user interface interactions, phone or video calling controls (e.g., dialing, start call, end call, ignore call), or any combination thereof, to name a few. For example, to determine application function controls, input detection circuitry 106 is configured to provide data representing the signals output by touch sensors 114 to a trained neural network 118. For example, input detection circuitry 106 provides data indicating which touch sensors 114 output a signal, a time that each touch sensor 114 generated a signal (e.g., a timestamp), locations of touchpad 108 corresponding to each touch sensor 114, or any combination thereof to trained neural network 118. Input detection circuitry 106 includes one or more microprocessors, processors (e.g., central processing units) executing instructions, microcontrollers, application-specific integrated circuits (ASICs), programmable logic devices, analog-to-digital converters, memories (e.g., random access memories), storages (e.g., flash storages, hard-disk storages, solid-state storages), or any combination thereof. For example, in some embodiments, input detection circuitry 106 includes at least a portion of the microprocessors, processors, microcontrollers, ASICs, programmable logic devices, analog-to-digital converters, memories, storage, or any combination thereof included in or otherwise connected to user device 100. As another example, according to some embodiments, input detection circuitry 106 includes one or more microcontrollers connected to touchpad 108.

Trained neural network 118, for example, includes one or more trained machine-learning models, neural networks (e.g., convolutional networks, residual networks), and the like configured to generate one or more application function controls as an output based on receiving one or more signals from one or more touchpads 108 as an input. As an example, trained neural network 118 includes one or more convolutional layers together configured to generate one or more application function controls using data representing the signals output by touch sensors 114 based on training data used to trained neural network 118. That is to say, based on one or more parameters (e.g., weights) indicated by the training data used to train neural network 118, one or more convolutional layers of trained neural network 118 determine one or more application function controls from data representing the signals output by touch sensors 114. Each convolutional layer, for example, is configured to apply one or more filters to received input data based on one or more parameters of the trained neural network 118 to determine one or more features of the received data (e.g., a feature map). For example, one or more convolutional layers of trained neural network 118 are configured to receive at least a portion of the data representing the signals output by touch sensors 114 as an input. These convolutional layers then apply one or more filters as defined by the parameters of trained neural network 118 to the portion of data representing the signals output by touch sensors 114 to determine one or more features of the data such as a type (e.g., press, drag, tap, gesture) of user interaction 112, direction of a user interaction 112, speed of a user interaction 112, location of a user interaction 112 relative to touchpad 108, or any combination thereof as indicated by at least a corresponding portion of the data.

These convolutional layers then provide data (e.g., a feature map) indicating these extracted features to a mapping layer, additional convolutional layers, or both. As an example, the convolution layers provide data indicating the extracted features to additional convolution layers which extract further features at different scales. These additional convolution layers then provide these further features to a mapping layer. The mapping layer of trained neural network 118, in embodiments, is configured to determine a single set of features from the features provided by one or more convolutional layers (e.g., from one or more feature maps provided by the one or more convolutional layers). For example, the mapping layer performs one or more operations (e.g., multiplication, addition, division) to determine a set of single features. The mapping layer then maps this set of single features to one or more application control functions based on the parameters of the trained neural network 118. After determining the application control functions using trained neural network 118, input detection circuitry 106 provides the application control function to an application 120 at least partially executing on user device 100. Based on receiving the application control function, the application 120 performs one or more application functions corresponding to the received user interaction 112.

To help reduce the power consumed by touchpad 108, touchpad 108 includes one or more activation regions 110 managed, for example, by input detection circuitry 106. These activation regions 110 each include a distinct group of one or more touch sensors 114 and are each associated with a corresponding activation weight 122 representing a respective activation probability (e.g., a percent or fractional chance a touch sensor 114 within the activation region 110 is active). As an example, a default activation region 110 includes each touch sensor 114 of touchpad 108 and is associated with a default activation weight 122 representing a default probability (e.g., ½). According to embodiments, for each touch sensor 114 within an activation region 110, input detection circuitry 106 is configured to determine an activation status (e.g., active or not active, on or off) based on the activation weight 122 associated with the activation region 110. As an example, for each touch sensor 114 in a first activation region 110 associated with a first activation weight, input detection circuitry 106 performs a Bernoulli trial to determine a binary output based on the probability represented by the first activation weight. That is to say, input detection circuitry 106 performs a Bernoulli trial based on the probability represented by the first activation weight with a first possible output of the Bernoulli trial (e.g., 0) indicating a touch sensor 114 is not to be active and a second possible output of the Bernoulli trial (e.g., 1) indicating a touch sensor 114 is to be active. Based on the Bernoulli trial generating an output indicating a corresponding touch sensor 114 is to be active, input detection circuitry 106 activates (e.g., provides power to) the touch sensor 114 such that the touch sensor 114 is able to detect user interactions 112. Likewise, based on the Bernoulli trial generating an output indicating a corresponding touch sensor 114 is not to be active, input detection circuitry 106 does not activate (e.g., does not provide power to) the touch sensor 114 such that the touch sensor 114 is not able to detect user interactions 112. In this way, input detection circuitry 106 is configured to only have a portion of the touch sensors 114 of touchpad 108 active at a time, helping reduce the power consumed by touchpad 108 and the user device 100 as a whole.

According to embodiments, input detection circuitry 106 is configured to manage the activation regions 110 of touchpad 108 to help reduce the likelihood that user interactions 112 with touchpad 108 are not detected by the touch sensors 114. As such, input detection circuitry 106 is configured to remove, add, modify, or any combination thereof one or more activation regions 110 of touchpad 108 based on touchpad 108 receiving one or more user interactions 112. As an example, initially touchpad 108 has a default activation region 110 that includes all the touch sensors 114 of touchpad 108 and that is associated with a default activation weight 122 representing a default probability of, for example, 50%. In response to one or more of the active touch sensors 114 of touchpad 108 detecting the presence of a user interaction 112, input detection circuitry 106 removes the default activation region 110, modifies the default activation region 110, adds one or more additional activation regions 110, or any combination thereof. In embodiments, input detection circuitry 106 is configured to remove, add, modify, or any combination thereof one or more activation regions 110 based on one or more features of the user interaction 112 detected by the touch sensors 114 such as the location, speed, direction, duration, or any combination thereof of the user interaction 112.

For example, based on the user interaction 112 received at the touchpad 108, input detection circuitry 106 determines which active touch sensors 114 detected the presence of the user interaction 112 based on the signals output by the touch sensors 114. Input detection circuitry 106 then identifies the location on touchpad 108 that received the user interaction based on the active touch sensors 114 that detected the presence of the user interaction 112. Such a location, for example, includes a point or area on touchpad 108. As an example, input detection circuitry 106 determines a location that includes a point at the center of the active touch sensors 114 that detected the presence of the user interaction 112. As another example, input detection circuitry 106 determines an area with a perimeter defined by one or more of the active touch sensors 114 that detected the presence of the user interaction 112. After determining the location on touchpad 108 at which the user interaction 112 was received, input detection circuitry 106 removes the previous activation regions 110 and defines a first new activation region 110 based on the determined location on touchpad 108. For example, input detection circuitry 106 defines a first new activation region 110 that includes the active touch sensors 114 that are a predetermined distance away (e.g., a predetermined number of touch sensors 114 away) from the location, each touch sensor 114 within the location, or both. Input detection circuitry 106 then associates this first new activation region 110 with an activation weight 122 representing a probability that ensures each touch sensor 114 within the first new activation region is active (e.g., a probability of 1). By generating an activation region where each touch sensor 114 is active based on the location of a current user interaction 112, input detection circuitry 106 helps ensure that the current user interaction 112 and subsequent user interactions 112.

Further, for example, based on the signals output by the touch sensors 114, input detection circuitry 106 determines the speed, direction, duration, or any combination thereof of the user interaction 112 with the touchpad 108. Based on the determined speed, direction, duration, or any combination thereof, input detection circuitry 106 defines one or more additional activation regions 110. As an example, input detection circuitry 106 determines one or more locations on touchpad 108 where the detected user interaction is indicated to travel based on the determined speed, direction, duration, or any combination thereof. From these determined locations on touchpad 108, the input detection circuitry 106 defines one or more additional activation regions 110. As an example, the input detection circuitry 106 defines a second activation region that is disposed immediately adjacent to one or more touch sensors 114 in the first new activation region 110, at least partially surrounding the first new activation region 110, or both. This second activation region includes each touch sensor 114 that is a predetermined number of touch sensors 114 away from one or more touch sensors 114 of the first new activation region in one or more directions. Further, the second activation region includes a second activation weight that represents a probability lower than the probability represented by the activation weight of the first activation region. That is to say, the second activation region includes a second activation weight indicating a lower likelihood of activation than the first activation region. Further, based on the determined speed, direction, duration, or any combination thereof, input detection circuitry 106, the input detection circuitry 106 defines a third activation region 110 that is disposed immediately adjacent to one or more touch sensors of the first new activation region, the second new activation region, or both. The third new activation region, for example, includes each touch sensor 114 that is a predetermined number of touch sensors 114 away from one or more touch sensors 114 of the first new activation region in one or more directions, the second new activation region in one or more directions, or both. Additionally, this third new activation region includes a third activation weight representing a probability that is lower than the probabilities represented by the first and second activation weights. For example, input detection circuitry 106 assigns the third activation region a third activation weight representing a probability lower than the probability of the second activation weight to indicate that the detected user interaction 112 is more likely to travel to the second new activation region than the third new activation region.

According to embodiments, after defining a new set of activation regions 110 based on a user interaction 112 (e.g., a first user interaction), input detection circuitry 106 is configured to remove, add, modify, or any combination thereof one or more activation regions in the new set of activation regions 110 based on receiving a subsequent (e.g., second) user interaction 112. Input detection circuitry 106 then continues removing, adding, modifying, or any combination thereof, activation regions 110 in this way until user device 100 is reset, user device 100 powers off, one or more applications 120 executing on user device 100 are launched, one or more applications 120 executing on user device 100 are ended, a predetermined amount of time elapses, or any combination thereof. In this way, input detection circuitry 106 is configured to maintain the activation regions 110 so as to help ensure that user interactions 112 are detected while also deactivating one or more touch sensors 114 to reduce the power consumption of user device 100.

Figure 2:
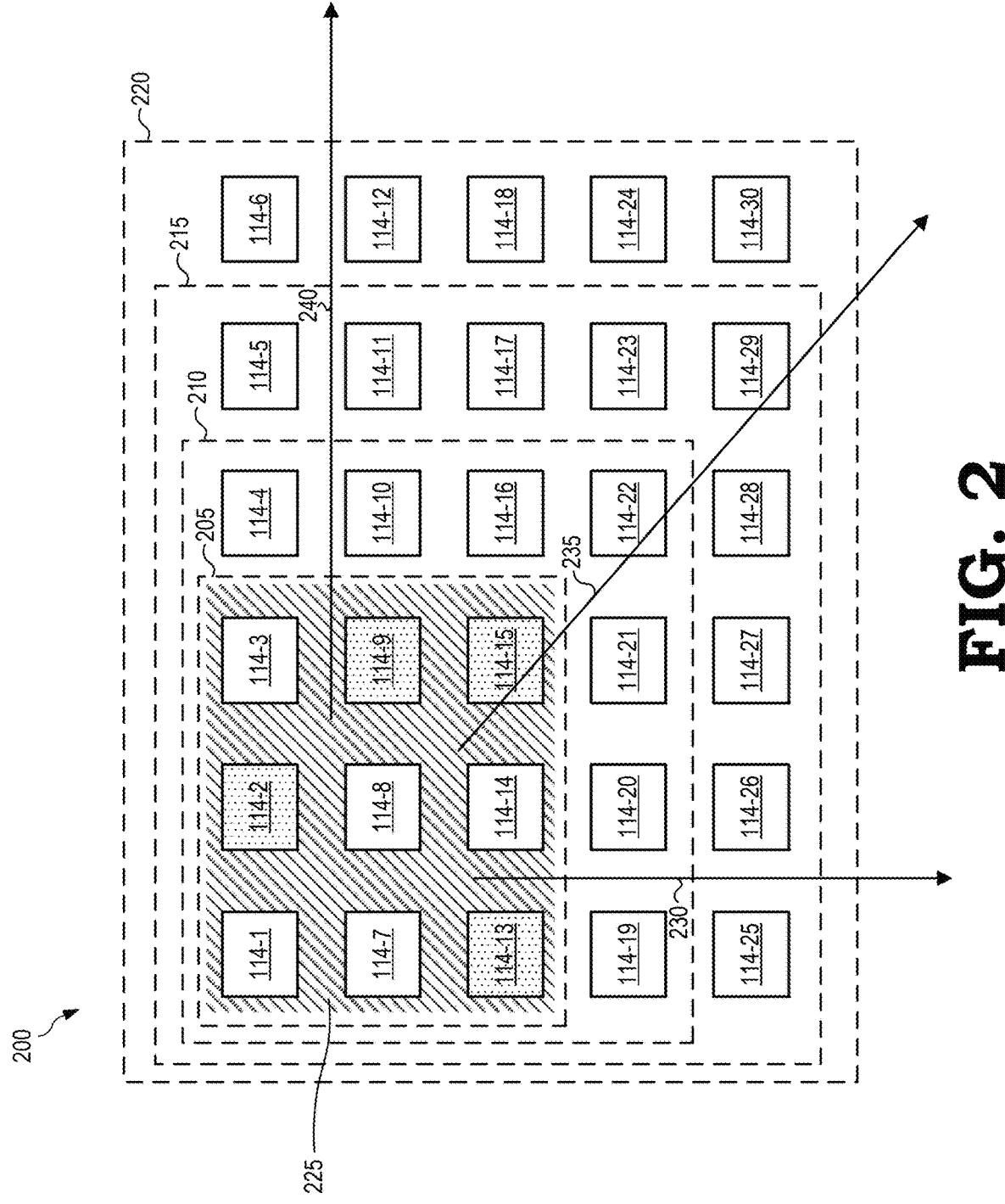
FIG. 2 is a block diagram of an example touchpad having multiple activation regions, in accordance with embodiments.

Referring now to FIG. 2, an example touchpad 200 having multiple activation regions is presented, in accordance with some embodiments. In embodiments, example touchpad 200 includes touch sensors 114-1 to 114-30 grouped into a first activation region 205, second activation region 210, third activation region 215, and fourth activation region 220 as defined by, for example, input detection circuitry 106. Though the example embodiment presented in FIG. 2 shows example touchpad 200 as including thirty touch sensors (114-1 to 114-30) arranged in five rows and six columns, in other embodiments, example touchpad 200 can include any number of touch sensors 114 arranged in any number of rows and any number of columns.

Referring to the example embodiment presented in FIG. 2, input detection circuitry 106 is configured to define the first activation region 205, second activation region 210, third activation region 215, and fourth activation region 220 based on one or more features of a received user interaction 112. For example, in response to example touchpad 200 receiving a user interaction 112, input detection circuitry 106 first determines the active touch sensors 114 that detected the presence of the user interaction 112. Based on the touch sensors 114 that detected the presence of the user interaction 112, input detection circuitry 106 determines a location (e.g., a point or area) on example touchpad 200 at which the user interaction 112 was received. As an example, referring to the embodiment presented in FIG. 2, based on touch sensors 114-2, 114-9, 114-13, and 114-15 detecting the presence of a user interaction 112, input detection circuitry 106 determines a location 225 on example touchpad 200 that includes an area with a perimeter defined by touch sensors 114-2, 114-9, 114-13, and 114-15. From the determined location (e.g., location 225) on example touchpad 200, input detection circuitry 106 then defines the first activation region 205. For example, input detection circuitry 106 defines a first activation region 205 that includes each touch sensor (e.g., touch sensors 114-1, 114-2, 114-3, 114-7, 114-8, 114-9, 114-13, 114-14, 114-15) within the determined location 225. Further input detection circuitry 106 associates the first activation region 205 with a first activation weight representing a probability that ensures each touch sensor within the first activation region 205 is active (e.g., a probability of 1).

Additionally, in embodiments, input detection circuitry 106 is configured to define a second activation region 210, third activation region 215, and fourth activation region 220 based on one or more features of the received user interaction. That is to say, input detection circuitry 106 defines the second activation region, third activation region 215, and fourth activation region 220 based on the speed of the interaction, the location of the interaction, the duration of the interaction, the direction of the user interaction 112, or any combination thereof. In embodiments, based on the direction of the interaction, input detection circuitry 106 determines one or more paths in which the detected user interaction 112 may travel along example touchpad 200 from location 225. For example, based on the direction of the user interaction 112, input detection circuitry 106 determines a first path 230, a second path 235, and a third path 240. Though the example embodiment presented in FIG. 2 shows three paths (e.g., first path 230, second path 235, third path 240) determined for a user interaction 112, in other embodiments, any number of paths can be determined for each received user interaction 112. Further, though such paths 230, 235, 240 are represented in FIG. 2 as 1-dimensional rays, in other embodiments, such paths can include any 1-dimension or two-dimensional shape having, for example, any width (e.g., a width based on the user interaction 112). In embodiments, from the determined speed and direction of the user interaction 112, input detection circuitry 106 defines one or more additional activation regions. For example, based on one or more touch sensors 114 that are in the same direction as one or more determined paths 230, 235, 240 of the user interaction 112, input detection circuitry 106 defines one or more additional activation regions (e.g., defines the second activation region 210, the third activation region 215, and the fourth activation region 220).

To define the second activation region 210, input detection circuitry 106 determines a respective number of touch sensors 114 in each of one or more directions from the first activation region 205 that correspond (e.g., are the same as) the directions of one or more of the determined paths 230, 235, 240. For example, based on the determined paths 230, 235, 240, input detection circuitry 106 defines the second activation region 210 to include touch sensors 114-4, 114-10, 114-16, 114-19, 114-20, 114-21, and 114-22. Further, to define the third activation region 215, input detection circuitry 106 determines a respective number of touch sensors 114 in each of one or more directions from the first activation region 205, the second activation region 210, or both that correspond to the directions of one or more of the determines paths 230, 235, 240. As an example, to define the third activation region 215, input detection circuitry 106 determines one or more touch sensors 114 in one or more directions from the first activation region 205 (e.g., different from the directions from the first activation region 205 used to define the second activation region 210) that correspond to the directions of one or more of the determined paths 230, 235, 240. As another example, input detection circuitry 106 determines one or more touch sensors 114 in one or more directions from the second activation region 210 that correspond to the directions of one or more of the determines paths 230, 235, 240. Referring to the example embodiment presented in FIG. 2, input detection circuitry 106 defines the third activation region 215 to include touch sensors 114-5, 114-11, 114-17, 114-23, 114-25, 114-26, 114-27, 114-28, and 114-29. Additionally, to define the third activation region 215, input detection circuitry 106 determines a respective number of touch sensors 114 in each of one or more directions from the first activation region 205, the second activation region 210, the third activation region, or any combination thereof that correspond to the directions of one or more of the determines paths 230, 235, 240. For example, to define the fourth activation region 220, input detection circuitry 106 determines one or more touch sensors 114 in one or more directions from the third activation region 215 corresponding to one or more of the determined paths 230, 235, 240. Referring to the example embodiment presented in FIG. 2, input detection circuitry 106 defines the fourth activation region 220 to include touch sensors 114-6, 114-12, 114-18, 114-24, and 114-30.

Additionally, in embodiments, input detection circuitry 106 is configured to assign a corresponding activation weight 122 to each of the second activation region 210, the third activation region 215, and the fourth activation region 220. As an example, based on one or more determined features of the user interaction 112, one or more determined paths 230, 235, 240, or both, input detection circuitry 106 assigns a corresponding activation weight 122 to each of the second activation region 210, the third activation region 215, and the fourth activation region 220. In embodiments, using one or more determined features of the user interaction 112, one or more determined paths 230, 235, 240, or both, input detection circuitry 106 determines an order in which the second activation region 210, the third activation region 215, and the fourth activation region 220 will be interacted with by the user interaction 112. That is to say, an order indicating which groups of touch sensors 114 (e.g., the second activation region 210, the third activation region 215, the fourth activation region 220) will detect the user interaction 112 before other groups of touch sensors 114 (e.g., activation regions). Based on this order, input detection circuitry 106 then assigns corresponding activation weights 122 to the activation regions. For example, input detection circuitry 106 assigns activation weights 122 representing higher probabilities (e.g., activation weights 122 indicating a more likely chance to activate touch sensors 114) to activation regions 110 indicated to first receive the user interaction 112 and activation weights 122 representing lower probabilities (e.g., activation weights 122 indicating a less likely chance to activate touch sensors 114) to activation regions indicates to later receive the user interaction 112.

Referring to the example embodiment presented in FIG. 2, based on the determined paths 230, 235, 240, input detection circuitry 106 assigns a second activation weight to the second activation region 210 representing a probability that is lower than the probability represented by the first activation weight of the first activation region 205, a third activation weight to the third activation region 215 representing a probability that is lower than the probabilities represented by the first activation weight and the second activation weight, and a fourth activation weight to the fourth activation region 220 representing a probability that is lower than the probabilities represented by the first activation weight, the second activation weight, and the third activation weight. In this way, input detection circuitry 106 is configured to assign activation weights 122 representing higher activation probabilities to activation regions 110 more likely to receive the user interaction 112 (e.g., indicated to first receive the user interaction 112) and activation weights 122 representing lower activation probabilities to activation regions 110 less likely to receive the user interaction 112 (e.g., indicated to later receive the user interaction 112). By assigning activation weights 122 in this way, input detection circuitry 106 helps ensure activation regions 110 likely to receive the user interaction 112 are enabled to detect the user interaction 112 while also reducing the power consumption of activation regions 110 less likely to receive the user interaction 112.

Figures 3, 4:
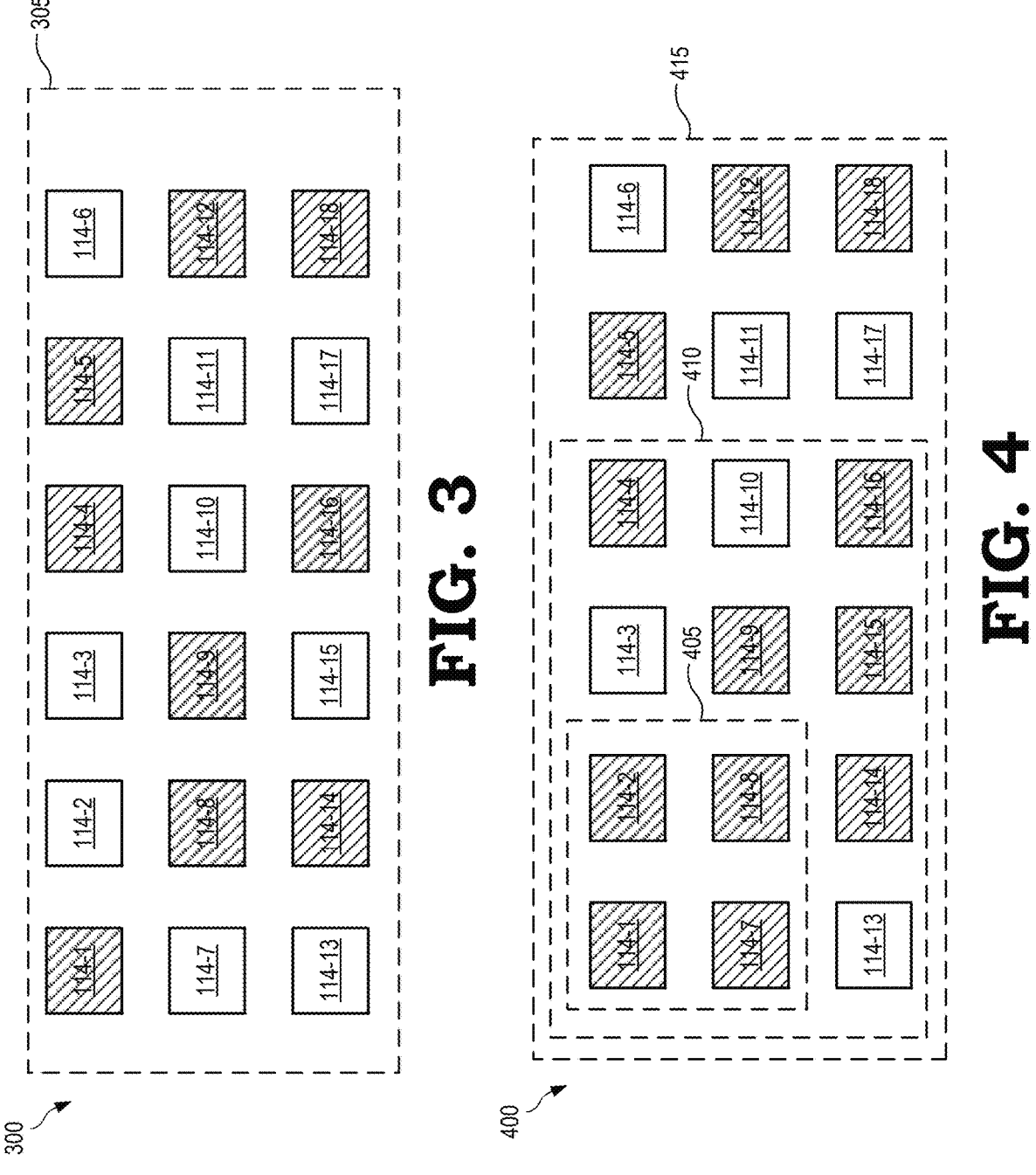
FIG. 3 is a block diagram of an example touchpad having a default activation region, in accordance with some embodiments.
FIG. 4 is a block diagram of an example touchpad having activation regions based on a user interaction, in accordance with some embodiments.

Referring now to FIG. 3, an example touchpad 300 having a default activation region is presented, in accordance with embodiments. In embodiments, example touchpad 300 is implemented within user device 100 as touchpad 108 at one or more points in time. According to embodiments, input detection circuitry 106 is configured to form a default activation region 305 based on one or more events occurring such as user device 100 powering on, user device 100 being reset, user device 100 powering off, one or more applications

120 executing on user device 100 being launched, one or more applications 120 executing on user device 100 ending, a predetermined amount of time elapsing, or any combination thereof. Such a default activation region 305, for example, is configured to enable example touchpad 300 to detect a user interaction 112 while also decreasing the power consumption of example touchpad 300. As an example, default activation region 305 is configured to have a first number of touch sensors 114 active that allow input detection circuitry 106 to determine a location (e.g., location 225) on example touchpad 300 at which a user interaction 112 was received while also having a second number of touch sensors 114 not active to reduce power consumption.

To this end, input detection circuitry 106 first defines default activation region 305 to include each touch sensor 114 of example touchpad 300. Though the example touchpad 300 presented in FIG. 3 includes 18 touch sensors (114-1 to 114-18) arranged in three rows and six columns, in other embodiments, example touchpad 300 can include any number of touch sensors 114 arranged in any number of rows (where rows >0) and any number of columns (where columns are >0). Further, input detection circuitry 106 is configured to assign a default activation weight 122 representing a default probability (e.g., 0.5, 50%) to default activation region 305. Based on the default activation weight 122, input detection circuitry 106 activates (e.g., provides power to) one or more touch sensors 114 included in default activation region 305. For example, for each touch sensor 114 of default activation region 305, input detection circuitry 106 performs a Bernoulli trial using the default probability represented by the default activation weight 122 to determine a first outcome (e.g., 0) indicating the touch sensor 114 is not to be active or a second outcome (e.g., 1) indicating the touch sensor 114 is not to be active. In line with the outcome of the Bernoulli trial, input detection circuitry 106 then activates (e.g., provides power to) or does not activate (e.g., does not provide power to) the touch sensor 114. That is to say, based on the Bernoulli trial indicating the first outcome for a corresponding touch sensor 114, input detection circuitry does not activate the touch sensor such that the touch sensor 114 is not able to detect user interactions 112. Further, based on the Bernoulli trial indicating the second outcome for a corresponding touch sensor 114, input detection circuitry does activate the touch sensor 114 such that the touch sensor 114 is able to detect user interactions 112. Referring to the example embodiment presented in FIG. 3, based on corresponding Bernoulli trials using the default activation weight 122 for each touch sensor 114 of example touchpad 300, input detection circuitry 106 activates touch sensors 114-1, 114-4, 114-5, 114-8, 114-12, 114-14, 114-16, and 114-18, indicated in FIG. 305 by patterned shading. Further, based on corresponding Bernoulli trials using the default activation weight 122 for each touch sensor 114 of example touchpad 300, input detection circuitry 106 does not activate touch sensors 114-2, 114-3, 114-6, 114-7, 114-10, 114-11, 114-13, 114-15, and 114-17, indicated in FIG. 305 by no shading.

Referring now to FIG. 4, an example touchpad 400 having activation regions based on a user input is presented, in accordance with embodiments. In embodiments, example touchpad 400 is implemented within user device 100 as touchpad 108 at one or more points in time. According to embodiments, input detection circuitry 106 is configured to define a first activation region 405, a second activation region 410, and a third activation region 415 based on a user interaction 112 received at example touchpad 400. As an example, based on one or more features (e.g., location, speed, direction, duration) of the received user interaction 112, input detection circuitry 106 determines one or more paths (e.g., paths 230, 235, 240) of the received user interaction 112. From these determined paths, input detection circuitry 106 defines the first activation region 405 to include touch sensors 114-1, 114-2, 114-7, 114-8; the second activation region 410 to include touch sensors 114-3, 114-4, 114-9, 114-10, 114-13, 114-14, 114-15, and 114-16; and the third activation region 415 to include touch sensors 114-5, 114-6, 114-11, 114-12, 114-17, and 114-18. Though the example touchpad 400 presented in FIG. 4 includes 18 touch sensors (114-1 to 114-18) arranged in three rows and six columns, in other embodiments, example touchpad 400 can include any number of touch sensors 114 arranged in any number of rows (where rows >0) and any number of columns (where columns are >0). Further, though FIG. 4 presents the first activation region 405 as including 4 touch sensors 114, the second activation region 410 as including eight touch sensors 114, and the third activation region 415 as including six touch sensors 114, in other embodiments, each activation region 405, 410, 415 can each include any number of touch sensors 114.

Additionally, input detection circuitry 106 is configured to assign a corresponding activation weight 122 to each activation region 405, 410, 415. For example, in embodiments, input detection circuitry 106 first determines a location (e.g., location 225) on example touchpad 400 at which the user interaction 112 was received. Input detection circuitry 106 then defines the first activation region 405 based on the determined location (e.g., to include each touch sensor 114 within the determined location). Further, to help ensure that the first activation region 405 is enabled to detect (e.g., continue to detect) the user interaction 112, input detection circuitry 106 assigns a first activation weight representing a probability that ensures each touch sensor 114 within the first activation region 405 is active. For example, input detection circuitry 106 assigns the first activation region 405 an activation weight 122 representing a probability of one or 100%. Based on this first activation weight, input detection circuitry 106 activates (e.g., provides power to) each touch sensor 114 within the first activation region, indicated in FIG. 4 by the patterned shading of touch sensors 114-1, 114-2, 114-7, and 114-8. Further, based on one or more determined features, one or more determined paths, or both of the received user interaction 112, input detection circuitry 106 determines respective activation weights 122 for the second activation region 410 and the third activation region 415. For example, based on one or more determined paths, input detection circuitry 106 determines an order in which the second activation region 410 and the third activation region 415 will receive the user interaction 112.

Referring to the example embodiment presented in FIG. 4, input detection circuitry 106 determines the second activation region 410 will receive the user interaction 112 first (e.g., from the first activation region 405) and the third activation region will receive the user interaction 112 second. Using this order, input detection circuitry 106 then assigns the second activation region 410 a second activation weight representing a probability that is lower than the probability of the first activation weight assigned to the first activation region 405 and assigned the third activation region 415 a third activation weight representing a probability that is lower than the probabilities represented by the first and second activation weights. Based on the assigned activation weights 122 of the second activation region 410 and the third activation region 415, input detection circuitry 106 performs Bernoulli trials for each touch sensor 114 of the second activation region 410 and the third activation region 415 to determine whether these touch sensors 114 are to be active or not active. For example, regarding the second activation region 410, using the probability represented by the second activation weight, input detection circuitry 106 performs Bernoulli trials to determine that touch sensors 114-4, 114-9, 114-14, 114-15, and 114-16 are to be active, indicated in FIG. 4 by patterned shading. Regarding the third activation region 415, using the probability represented by the third activation weight, input detection circuitry 106 performs Bernoulli trials to determine that touch sensors 114-5, 114-12, and 114-18 are to be active, indicated in FIG. 4 by patterned shading.

Figure 5:
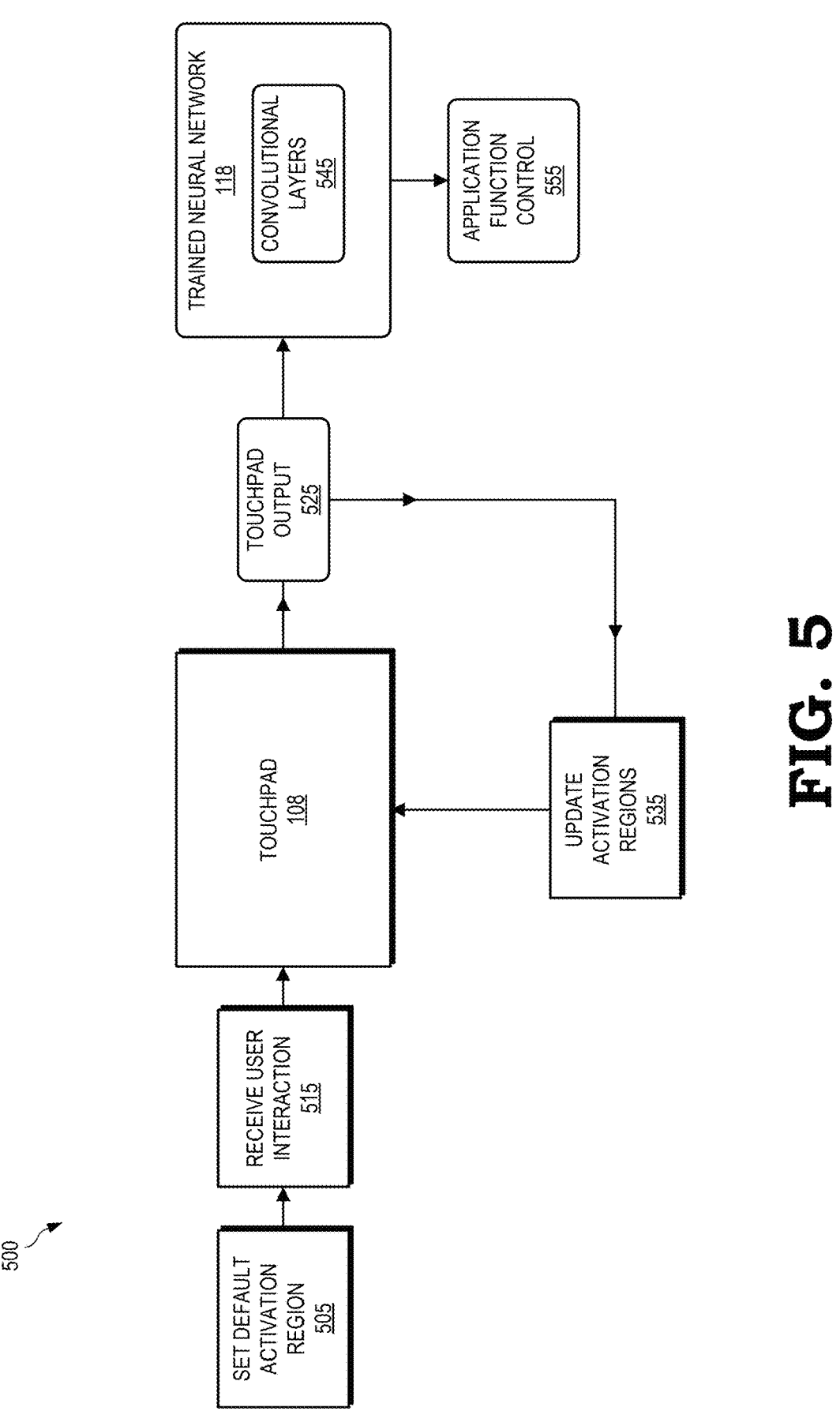
FIG. 5 is a flow diagram of an example operation for defining one or more activation regions of a touchpad based on a user interaction, in accordance with some embodiments.

Referring now to FIG. 5, an example operation 500 for forming one or more activation regions of a touchpad based on a user input is presented, in accordance with embodiments. In embodiments, example operation 500 is implemented at least in part by input detection circuitry 106 to add, remove, modify, or any combination thereof one or more activation regions 110 based on a received user interaction 112. For example, example operation 500 includes, at block 505, setting a default activation region. As an example, at block 505, based on user device 100 powering on, user device 100 being reset, user device 100 powering off, one or more applications 120 executing on user device 100 being launched, one or more applications 120 executing on user device 100 ending, a predetermined amount of time elapsing, or any combination thereof, input detection circuitry 106 establishes a default activation region (e.g., default activation region 305) associated with a default activation weight that represents a default probability (e.g., 0.5, 50%). After establishing the default activation region, at block 515, touchpad 108 receives a user interaction 112. That is to say, one or more touch sensors 114 of touchpad 108 detect the presence of a user interaction 112. In response to receiving the user interaction 112, touchpad 108 produces a touchpad output 525 that includes signals generated by one or more touch sensors 114 of touchpad 108, data representing these signals generated by one or more touch sensors 114 of touchpad 108, or both. As an example, touchpad output 525 includes data representing signals generated by one or more touch sensors 114 of touchpad 108 that detected the presence of the received user interaction 112.

According to embodiments, example operation 500 includes input detection circuitry 106 providing touchpad output 525 to trained neural network 118 configured to generate one or more application function controls 555 based on touchpad output 525. As an example, trained neural network 118 includes a convolutional neural network that includes one or more convolutional layers 545. These convolutional layers 545, for example, are configured to extract one or more features of the received user interaction 112 from touchpad data such as the speed of the interaction, the location of the interaction on touchpad 108, the duration of the interaction, direction of the interaction, or any combination thereof. As an example, based on the training data used to train neural network 118, each convolutional layer 545 is configured to perform one or more operations (e.g., matrix multiplication operations) that include using one or more parameters (e.g., weights) determined from the training data. For example, these operations include multiplying matrices including one or more parameters by matrices that include data (e.g., embeddings) representing at least a portion of touchpad output 525, data received from one or more other convolutional layers 545, or both. From performing these operations, each convolutional layer 545 is configured to extract one or more features of the received user interactions. Trained neural network 118 then maps these extracted features based on one or more parameters (e.g., weights) to corresponding application function controls 555. An application function control 555, for example, includes data that causes an application 120 (e.g., interpretable by an application 120) to perform one or more functions such as launching an application, closing an application, multimedia controls (e.g., video play, video pause, audio play, audio pause, volume up, volume down, skip song, rewind song, skip song, noise canceling settings), text input, user interface interactions, phone or video calling controls (e.g., dialing, start call, end call, ignore call), or any combination thereof, to name a few.

Additionally, example operation 500, at block 535, includes input detection circuitry 106 updating one or more activation regions 110 of touchpad 108. For example, block 535 includes input detection circuitry 106 updating the default activation region established at touchpad 108. To update one or more activation regions 110 of touchpad 108, input detection circuitry 106 first determines the location (e.g., location 225) on touchpad where the user interaction 112 was received. For example, based on touchpad output 525, input detection circuitry 106 determines the location on touchpad 108 where the user interaction 112 was received. Such a location, for example, includes a point on touchpad 108 or an area of touchpad 108. Using the location on touchpad 108, input detection circuitry 106 defines a first activation region. As an example, input detection circuitry 106 defines the first activation region such that the first activation region includes each touch sensor 114 of touchpad 108 at the determined location (e.g., area). As another example, input detection circuitry 106 defines the first activation region such that the first activation region includes each touch sensor 114 of touchpad 108 that is within a predetermined distance (e.g., a predetermined number of touch sensors 114) from the determined location (e.g., point). Additionally, input detection circuitry 106 associates this first activation region with a first activation weight. For example, input detection circuitry 106 associates the first activation region with a first activation weight representing a probability that ensures each touch sensor 114 within the first activation region is active (e.g., a probability of 1 or 100%).

Still referring to block 535, input detection circuitry 106 is further configured to define one or more additional activation regions based on the determined features of the user interaction. For example, based on one or more determined features (e.g., speed, direction), input detection circuitry 106 determines one or more paths (e.g., paths 230, 235, 240) of the user interaction 112. Using these paths, input detection circuitry 106 defines one or more additional activation regions. As an example, based on the paths and determined features of the user interaction 112, input detection circuitry 106 defines one or more additional activation regions that each include a respective number of touch sensors 114 in one or more directions corresponding to the determined paths from the first activation regions, one or more other activation regions, or both. According to embodiments, for example, input detection circuitry 106 defines a second activation region including a respective number of touch sensors in one or more directions corresponding to the determined paths from the first activation region. Additionally, for example, input detection circuitry 106 defines a third activation region including a respective number of touch sensors in one or more directions corresponding to the determined paths from the second activation region. After defining these additional activation regions, input detection circuitry 106 assigns each of these additional activation regions a corresponding activation weight 122. For example, based on the order in which the user interaction 112 will be received by the additional activation regions, input detection circuitry 106 assigns each additional activation region with a corresponding activation weight 122. In embodiments, for example, input detection circuitry 106 assigns the second activation region a second activation weight representing a probability that is lower than (e.g., indicating a lower likelihood than) the probability of the first activation weight assigned to the first activation region, and assigns the third activation region a third activation weight representing a probability that is lower than the probabilities of the first and second activation weights.

Figure 6:
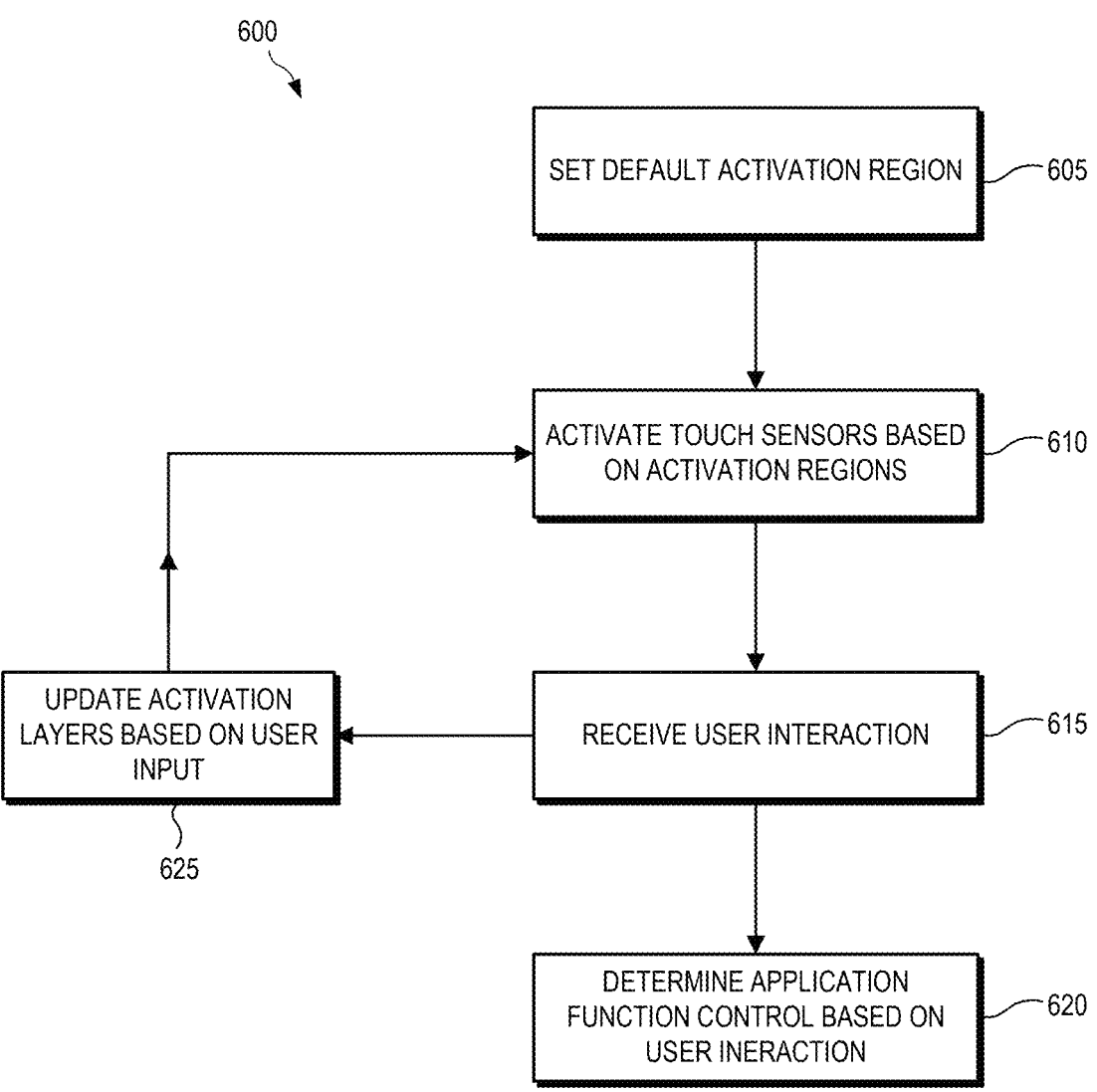
FIG. 6 is a flow diagram on an example method for generating an application function control and modifying one or more activation regions based on one or more user interactions, in accordance with embodiments.

Referring now to FIG. 6, an example method 600 for generating an application function control and modifying one or more activation regions based on one or more user inputs is presented, in accordance with embodiments. According to embodiments, example method 600 is implemented at least in part by user device 100. For example, at block 605 of example method 600, input detection circuitry 106 sets a default activation region for touchpad 108. As an example, based on one or more events (e.g., user device 100 powering on, user device 100 being reset, user device 100 powering off, one or more applications 120 executing on user device 100 being launched, one or more applications 120 executing on user device 100 ending, a predetermined amount of time elapsing), input detection circuitry 106 establishes a default activation region that includes each touch sensor 114 of touchpad 108 and that is associated with a default activation weight representing a default probability (e.g., 0.5, 50%). After establishing the default activation region, at block 610, input detection circuitry 106 activates each touch sensor 114 of touchpad 108 based on the default activation weight (e.g., based on the default probability represented by the default activation weight). As an example, for each touch sensor 114 in the default activation region, input detection circuitry 106 performs a Bernoulli trial to determine a first outcome (e.g., not active) or a second output (e.g., active) based on the default activation weight. Input detection circuitry 106 then activates or does not activate a touch sensor 114 based on the corresponding outcome of the Bernoulli trial.

At block 615, touchpad 108 is configured to receive a user interaction 112 such a user's finger or a stylus tapping, dragging across, performing gestures on, pressing, or any combination thereof touchpad 108. In response to receiving the user interaction 112, touchpad 108 generates a touchpad output (e.g., touchpad output 525) that includes the signals generated by the touch sensors 114 of touchpad 108 that detected the user interaction 112, data representing the signals generated by the touch sensors 114 of touchpad 108 that detected the user interaction 112. At block 620, input detection circuitry 106 provides the touchpad output to trained neural network 118 configured to generate one or more application function controls (e.g., application function controls 555) based on the touchpad output. For example, one or more convolutional layers 545 first extract one or more features (e.g., speed, distance, direction, duration, location on touchpad 108) of the received user interaction 112 based on one or more parameters derived from data used to train neural network 118 (e.g., training data). Trained neural network 118 then maps, based on one or more parameters derived from the training data, one or more of these extracted features to one or more corresponding application function controls such as launching an application, closing an application, multimedia controls, text input, user interface interactions, phone or video calling controls, or any combination thereof, to name a few. Input detection circuitry 106 then provides these application control functions to corresponding applications 120 executing on user device 100.

Additionally, concurrently with block 620, at block 625, input detection circuitry 106 is configured to update one or more activation regions of touchpad 108 based on the received user interaction 112. For example, input detection circuitry 106 removes the default activation region and defines one or more new activation regions. To this end, based on the touchpad output, input detection circuitry 106 determines the location on touchpad 108 that received the user interaction 112. This determined location, for example, includes a point on touchpad 108, an area on touchpad 108, or both. Input detection circuitry 106 then defines a first activation region such that the first activation region includes each touch sensor 114 within the determined location, each touch sensor 114 within a predetermined distance from (e.g., a predetermined number of touch sensors 114 from) the determined location, or both. Additionally, input detection circuitry 106 associates this first activation region with an activation weight 122 (e.g., first activation weight) that ensures each touch sensor 114 within the first activation region is active (e.g., an activation weight representing a probability of 1 or 100%). Further, at block 625, input detection circuitry 106 defines one or more additional activation regions based on one or more features of the received user interaction 112. As an example, based on the determined features, input detection circuitry 106 determines one or more paths (e.g., paths 230, 235, 240) of the received user interaction 112. Input detection circuitry 106 then defines one or more activation regions 110 each including a number of touch sensors 114 in one or more directions corresponding to the determined paths from the first activation region, one or more other activation regions, or both. For example, input detection circuitry 106 defines a second activation region including a respective number of touch sensors in one or more directions corresponding to the determined paths from the first activation region. Additionally, for example, input detection circuitry 106 defines a third activation region including a respective number of touch sensors in one or more directions corresponding to the determined paths from the first activation regions, the second activation region, or both.

Still referring to block 625, input detection circuitry 106 is configured to assign a corresponding activation weight 122 to each determined additional activation region 110. For example, based on an order in which the user interaction 112 will be received by the determined additional activation regions 110, input detection circuitry 106 assigns corresponding activation weights 122. As an example, based on an order indicating that the second activation region will receive the user interaction 112 before the third activation region, input detection circuitry 106 assigns the second activation region a second activation weight representing a probability lower than the probability of the first activation weight of the first activation region, and assigns the third activation region a third activation weight representing a probability lower than the probabilities of the first and second activation weights. After assigning these activation weights 122, at block 610, the input detection circuitry 106 activates the touch sensors 114 within each activation region 110 based on the corresponding activation weight 122 associated with the activation region 110. For example, for each touch sensor 114 within a respective activation region 110, input detection circuitry 106 performs a Bernoulli Trial based on the activation weight 122 associated with the activation region 110 to determine a first outcome (e.g., not active) or a second outcount (e.g., active). Input detection circuitry 106 then actives or does not activate the touch sensors 114 within the activation region 110 based on the corresponding outcomes of the Bernoulli trials. At block 615, a second user interaction 112 is received. Based on this second user interaction 112, at block 620, the trained neural network 118 determines one or more additional application function controls. Further, at block 625, input detection circuitry 106 again updates the activation regions 110 of touchpad 108. User device 100 then continues in this way until a default event occurs such as such as user device 100 powering on, user device 100 being reset, user device 100 powering off, one or more applications 120 executing on user device 100 being launched, one or more applications 120 executing on user device 100 ending, a predetermined amount of time elapsing, or any combination thereof.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or another instruction format that is interpreted or otherwise executable by one or more processors.

A computer readable storage medium may include any storage medium, or combination of storage media, accessible by a computer system during use to provide instructions and/or data to the computer system. Such storage media can include but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to receiving a user interaction at a touchpad, defining a plurality of activation regions of the touchpad based on a location and direction of the user interaction at the touchpad;
   assigning a corresponding activation weight to each activation region of the touchpad, wherein activation regions that extend farther in the direction of the user interaction are assigned progressively lower activation weights;
   activating each touch sensor within each activation region based on the activation weight assigned to that activation region, wherein each activated touch sensor is able to detect user interactions; and
   generating at least one extended reality (XR) application control signal based on output from one or more activated touch sensors.

2. The method of claim 1, wherein
   defining the plurality of activation regions comprises determining one or more paths of the user interaction based on the direction of the user interaction and spatially configuring the plurality of activation regions to at least partially overlap along at least one of the determined paths.

3. The method of claim 1, wherein activating the touch sensor within an activation region comprises:
   generating a first outcome or a second outcome based on the activation weight assigned to the activation region;
   in response to generating the first outcome for the touch sensor, activating the touch sensor such that the touch sensor is able to detect subsequent user interactions; and
   in response to generating the second outcome, not activating the touch sensor such that the touch sensor is not able to detect subsequent user interactions.

4. The method of claim 1, wherein generating the at least one XR application control signal further comprises:
   generating, by a trained neural network, data representing a control associated with an XR software application based on the user interaction; and
   modifying the XR software application based on the control.

5. The method of claim 1, further comprising:
   activating at least a subset of touch sensors of the touchpad based on a default activation weight prior to receiving the user interaction, wherein each activated touch sensor is able to detect user interactions; and
   in response to receiving the user interaction, redefining the plurality of activation regions of the touchpad and assigning corresponding activation weights.

6. The method of claim 1, further comprising:
   defining a second activation region of the touchpad based at least on the location of the user interaction relative to a first activation region.

7. The method of claim 6, further comprising:
   activating each touch sensor in the second activation region of the touchpad based on the activation weight assigned to the second activation region such that each touch sensor in the second activation region is able to detect user interactions.

8. The method of claim 1, wherein the activation weights assigned to the plurality of activation regions define a hierarchy based on the direction of the user interaction, such that an activation region that is predicted to be contacted earlier in the direction of the user interaction is assigned a higher activation weight than an activation region that is predicted to be contacted later in the direction of the user interaction.

9. A user device, comprising:
   a touchpad including a plurality of touch sensors; and
   an input detection circuitry configured to:
      define a plurality of activation regions of the touchpad in response to the touchpad receiving a user interaction, wherein the regions are based on a location and a direction of the user interaction at the touchpad;
      assign a corresponding activation weight to each of the plurality of activation regions, wherein activation regions that extend farther in the direction of the user interaction are assigned progressively lower activation weights;
      activate the touch sensor within each of the plurality of activation regions based on the activation weight assigned to the that activation region, wherein each activated touch sensor is able to detect user interactions; and
      generate at least one extended reality (XR) application control signal based on output from one or more activated touch sensors.

10. The user device of claim 9, wherein the input detection circuitry is configured to
   define the plurality of activation regions by:
      determining one or more paths of the user interaction based on the direction of the user interaction; and
      spatially configuring the plurality of activation regions to at least partially overlap at least one of the determined paths.

11. The user device of claim 10, wherein the input detection circuitry is configured to:
   assign the corresponding activation weight to each activation region based on a hierarchy defined by the direction of the user interaction, such that an activation region that is predicted to be contacted earlier in the direction of the user interaction is assigned a higher activation weight than an activation region that is predicted to be contacted later in the direction of the user interaction.

12. The user device of claim 9, wherein:
   the touchpad is configured to produce an output based on the user interaction; and the input detection circuitry includes a trained neural network configured to generate a control associated with an XR software application based on the output from the touchpad.

13. The user device of claim 9, wherein the input detection circuitry is configured to:

for each touch sensor within the activation region:

generate a first outcome or a second outcome based on the activation weight assigned to the activation region;

in response to generating the first outcome, activate the touch sensor such that the touch sensor is able to detect user interactions; and in response to generating the second outcome, not activate the touch sensor such that the touch sensor is not able to detect user interactions.

14. The user device of claim 9, wherein the input detection circuitry is configured to:

before the user interaction is received, activate each sensor of the touchpad based on a default activation weight, wherein each activated touch sensor is able to detect user interactions; and in response to receiving the user interaction, define the region of the touchpad.

15. The user device of claim 9, wherein the input detection circuitry is configured to:

define a second activation region based at least on the location of the user interaction relative to a first activation region.

16. The user device of claim 15, wherein the input detection circuitry is configured to:

activate each touch sensor in the second activation region of the touchpad based on the activation weight assigned to the second activation region such that each touch sensor in the second activation region is able to detect user interactions.

17. A non-transitory computer-readable storage medium including instructions that, when executed by at least one processor of a user device, cause the at least one processor to:

define a plurality of activation regions of a touchpad in response to receiving a user interaction at the touchpad, wherein the regions are defined based on a location and a direction of the user interaction at the touchpad;

assign a corresponding activation weight to each activation region of the touchpad, wherein activation regions that extend farther in the direction of the user interaction are assigned progressively lower activation weights;

activate each touch sensor within each activation region based on the activation weight assigned to that activation region, wherein each activated touch sensor is able to detect user interactions; and generate at least one extended reality (XR) application control signal based on output from one or more activated touch sensors.

18. The non-transitory computer-readable storage medium of claim 17 further including instructions that cause the at least one processor to:

for the touch sensor within the activation region:

generate a first outcome or a second outcome based on the activation weight assigned to the activation region;

in response generating the first outcome, activate the touch sensor such that the touch sensor is able to detect user interactions; and in response to generating the second outcome, not activate the touch sensor such that the touch sensor is not able to detect user interactions.

19. The non-transitory computer-readable storage medium of claim 17 further including instructions that cause the at least one processor to:

generate, by a trained neural network, data representing a control associated with an XR software application based on the user interaction; and modify the XR software application based on the control.

20. The non-transitory computer-readable storage medium of claim 17 further including instructions that cause the at least one processor to:

activate at least a subset of touch sensors of the touchpad based on a default activation weight prior to receiving the user interaction, wherein each activated touch sensor is able to detect user interactions; and in response to receiving the user interaction, redefine the plurality of activation regions of the touchpad and assigning corresponding activation weights.

21. The non-transitory computer-readable storage medium of claim 17 further including instructions that cause the at least one processor to:

define a second activation region of the touchpad based at least on the location of the user interaction relative to a first activation region; and activate each touch sensor in the second activation region such that each touch sensor in the second activation region is able to detect user interactions.

* * * * *